Jan. 28, 1941.  A. Q. HEIDEBRECHT  2,229,849
INSULATING SPLICE COVER
Filed Aug. 21, 1939
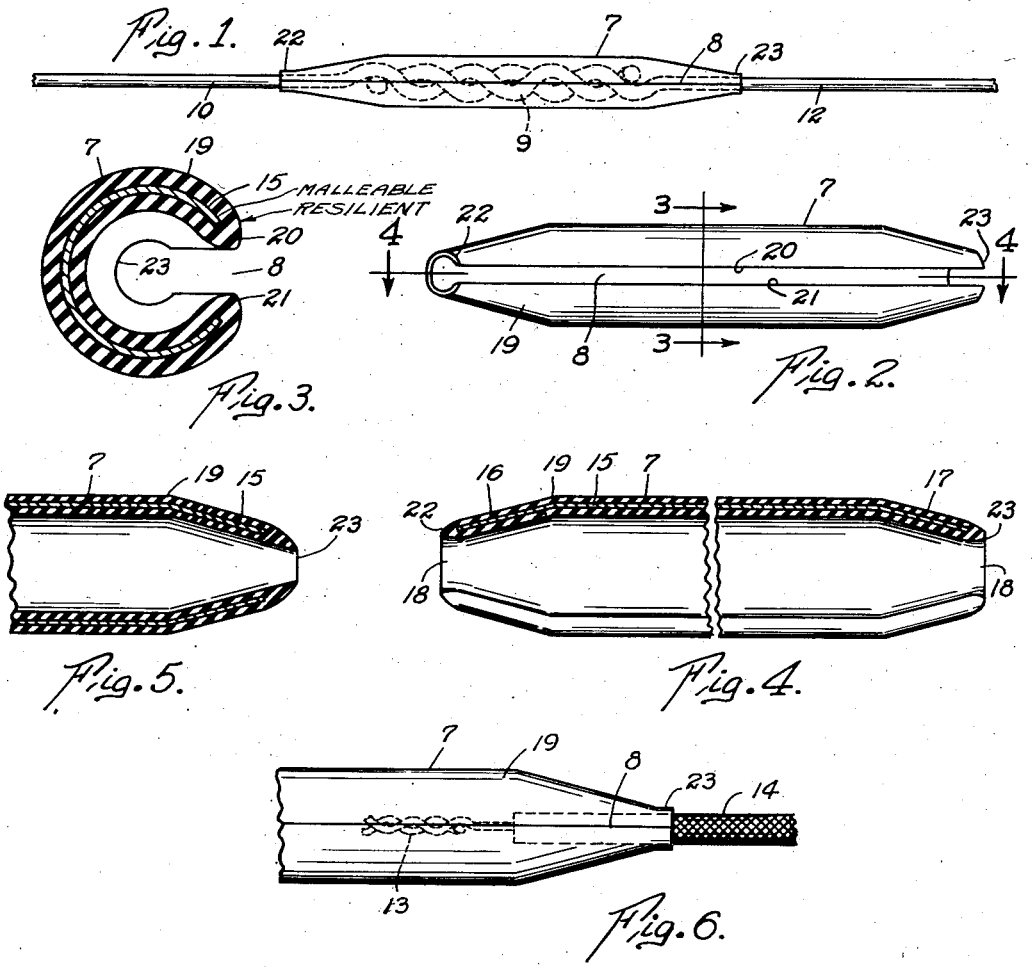
Abraham Quincy Heidebrecht
INVENTOR
BY Frank Zugelter
ATTORNEY Patented Jan. 28, 1941

2,229,849

UNITED STATES PATENT OFFICE 2,229,849

INSULATING SPLICE COVER

Abraham Quincy Heidebrecht, Burrton, Kans.

Application August 21, 1939, Serial No. 291,124

7 Claims. (Cl. 174—84)

The present invention relates to an insulating splice cover which may be used upon either bare or insulated wire, and which is particularly useful for protecting splices made in electricity conductors.

An object of the invention is to provide a novel splice cover for the purpose stated, which may be applied to splices with a minimum of time and effort, using a common tool such as a pair of electrician's pliers.

Another object of the invention is to provide a splice cover which will protect a splice from the elements, and will preclude grounding and short-circuiting of the splice upon nearby wires or other electricity conducting objects.

A further object of the invention is to provide a device of the character stated, having insulating characteristics, and which is so constructed as to aid in precluding separation of the wires at a spliced connection.

Another object is to so form the splice cover as to enhance its structural strength in a simple and inexpensive manner, so that a force applied to the device will be transmitted along its length for providing a weather proof joint for the splice.

Another object is to provide an insulating splice cover of novel construction, which is simple and inexpensive to manufacture, and which is highly effective for the purpose stated.

These and other objects are attained by the means described herein and disclosed in the accompanying drawing, in which:

Fig. 1 is an elevational view showing the insulating splice cover of the invention applied to a splice connecting two bare wires.

Fig. 2 is an enlarged perspective view of the improved splice cover.

Fig. 3 is an enlarged cross-sectional view taken on line 3—3 of Fig. 2.

Fig. 4 is an enlarged cross-sectional view taken on line 4—4 of Fig. 2.

Fig. 5 is a fragmental view similar to Fig. 4 showing a slightly modified form of the device, wherein is provided a feather edge at a terminal end of the splice cover.

Fig. 6 is a fragmental elevational view somewhat similar to Fig. 1, showing the device of the invention applied to the splice of an insulated wire.

In the accompanying drawing, the character 7 indicates generally the insulating splice cover of the invention. The splice cover comprises an elongated substantially cylindrical body split lengthwise at 8 from end to end so that it may be slipped laterally onto the wires for completely covering the spliced connection. As illustrated in Fig. 1, the device of the invention covers completely the splice 9 connecting the wires 10 and 12. The illustration referred to shows a splice made between bare wires, but it will readily be understood that the device of the invention may be applied to splices such as 13 for connecting wires which carry insulation, indicated at 14, of Fig. 6.

The splice cover comprises a core 15 which is preferably formed from flexible or malleable sheet metal having the characteristic of being deformable upon application of force thereto, without a substantial tendency to return to its original form. In other words, the metallic core preferably is of a material which is substantially non-resilient, such as brass, copper, lead, ordinary sheet iron or the like. The particular metal used, so long as it has the required characteristic, is of no substantial consequence, and may be used as a core material within the scope of this invention.

As is most clearly indicated in Figs. 3 and 4, the longitudinally split core has tapered or coniform ends, indicated at 16 and 17, for reducing the size of the end terminal openings 18 of the splice cover. The reduced ends afford also a desirable structural reinforcement which enables the open terminal ends to close upon a wire when the squeezing force of a pair of pliers is applied to the substantially cylindrical portion of the core which is intermediate the coniform ends.

The core 15 preferably is sheeted or coated both interiorly and exteriorly with insulating material indicated by the reference character 19. The insulating material may be rubber or rubber composition, gutta percha, gum or resinous compound, or any other substance having the qualities of electrical insulation and pliability. Certain of the materials mentioned will have a cushioning effect such as to frictionally grip the splice thereby aiding in precluding separation of the wires at the splice. This is clearly observed by referring to Fig. 1, wherein the inner wall of the splice cover tightly contacts the splice when the slit 8 is closed upon it.

Particular attention is directed to the cross-sectional views of the drawing which show that the insulating material 19 extends beyond the edges of the deformable core 15 so as to provide resilient or supple lips 20 and 21 along the slit 8, as well as at 22 and 23 where the wires enter the terminal ends of the splice cover. With reference to Fig. 3 particularly, it will be noted that the application of force by means of a pair of pliers or the like to the exterior of the splice cover, will result in cramping the splice cover about the splice, and also about the wires at either side of the splice, and the resilient or supple lips 20 and 21 will obviously be brought into tight engagement along the full length of the slit 8. Due to the yielding characteristic of the lips, there will be formed a tight weather-proof seal along the length of the splice, and no part of the splice therefore will be exposed to the weather or to the objects upon which the splice may be grounded or short-circuited.

The cross-sectional view of Fig. 5 is intended to illustrate supple or resilient lips 22 and 23 which are characterized by a feather edge, or one which is extremely pliant, for producing a highly effective seal about the wire. It is to be understood that both ends of the splice cover may be provided with such lips, and the edges of the slit also. Figs. 1 and 6 clearly illustrate how the lips will adapt themselves to the contour of the wire, at 23.

It should readily be observed that the tapered or coniform ends afford structural support for the intermediate portion of the core to preclude destructive crushing and undue distortion of the general formation when the device is cramped about the splice by the application of a squeezing force to the intermediate portion thereof. In other words, the conical or tapered ends will respond to a cramping force applied to the intermediate portion of the core, and will readily close about the wire or its insulation to form a tight weather-proof seal for the splice. The desirable results obtained are due largely to the fact that the edges and ends of the core fall short of extending to the extreme ends of the splice cover, and to the edges of the slit 8 where the splice is introduced. The insulating material may be applied to the core by dipping or coating the core in any approved manner.

It is to be understood that various modifications and changes may be made in the structural details of the device, within the scope of the appended claims, without departing from the spirit of the invention.

What is claimed is:

1. An insulating cover for a wire splice, which comprises an elongated substantially cylindrical flexible body split lengthwise from end to end for reception of a wire splice therein, said ends being resilient and supple for fitting closely about the wires at opposite ends of the splice, and a reinforcing element embedded in the flexible body, said element consisting of a sheet of malleable metal having the characteristic of remaining deformed and keeping the flexible body in close contact upon a wire splice when squeezed by a crushing force applied to the exterior of the flexible body.

2. An insulating cover for a wire splice, which comprises an elongated substantially cylindrical flexible body split lengthwise from end to end for reception of a wire splice therein, said ends being resilient and supple for fitting closely about the wires at opposite ends of the splice, the edges of the body at the split having coextensive resilient supple lips adapted to engage and deform upon being forced together incident to application of pressure to the body sufficient to reduce its diameter, and a reinforcing element embedded in the flexible body, said element consisting of a sheet of malleable metal having the characteristic of remaining deformed and keeping the flexible body in close contact upon a wire splice when squeezed by a crushing force applied to the exterior of the flexible body.

3. An insulating cover for a wire splice, which comprises an elongated substantially cylindrical flexible body split lengthwise from end to end for reception of a wire splice therein, the edges of the body along the split including resilient lips adapted to engage and deform upon being forced together incident to application of pressure to the body sufficient to reduce its diameter, and a reinforcing element embedded in the flexible body, said element consisting of a sheet of malleable metal having the characteristic of remaining deformed and keeping the flexible body in close contact upon a wire splice when squeezed by a crushing force applied to the exterior of the flexible body.

4. As a new article of manufacture, an insulating cover for a wire splice which comprises a core of malleable non-resilient sheet metal bent to a split cylinder formation, said core being characterized by the quality of remaining deformed when crushed, an enveloping coating of insulating material covering the core along its edges and opposite faces, the ends of the cylindrical formation being tapered to a diameter less than that of the intermediate portion between said ends, resilient and supple lips on the core extending beyond the core at the ends thereof and along the core edges at the split, said lips being integral with the insulating coating and adapted to form part of a weather proof joint upon forcible application of the cover about a wire splice.

5. As a new article of manufacture, an insulating cover for a wire splice which comprises a core of malleable sheet metal completely enveloped in a coating of insulating material, said metal sheet being characterized by the quality of remaining deformed when crushed, and bent to substantially a cylindrical formation with the opposed edges thereof separated for lateral introduction of a wire splice into the confines of the core, the said opposed and separated edges being insulation covered with the insulation extending beyond said core edges to provide resilient deformable lips engageable one with the other upon application of force to the core sufficient for reducing the diameter of the core formation.

6. As a new article of manufacture, an insulating cover for a wire splice which comprises a core of malleable sheet metal completely enveloped in a coating of insulating material, said metal sheet being characterized by the quality of remaining deformed when crushed, and bent to substantially a cylindrical formation with the opposed edges thereof separated for lateral introduction of a wire splice into the confines of the core, the said opposed and separated edges being insulation covered with the insulation extending beyond said core edges to provide resilient deformable lips engageable one with the other upon application of force to the core sufficient for reducing the diameter of the core formation, and a coniform terminus at each end of the formed sheet metal core providing wire receptive end openings adapted to contract with the reduction of the core diameter as stated.

7. As a new article of manufacture, an insulating cover for a wire splice which comprises a core of malleable sheet metal completely enveloped in a coating of insulating material, said metal sheet being characterized by the quality of remaining deformed when crushed, and bent to substantially a cylindrical formation with the opposed edges thereof separated for lateral introduction of a wire splice into the confines of the core, the said opposed and separated edges being insulation covered with the insulation extending beyond said core edges to provide resilient deformable lips engageable one with the other upon application of force to the core sufficient for reducing the diameter of the core formation, and a coniform terminus at each end of the formed sheet metal core providing wire receptive end openings adapted to contract with the reduction of the core diameter as stated, and supple resilient lips about said end openings extending beyond the coniform termini of the core, axially of the core.

ABRAHAM QUINCY HEIDEBRECHT.